(12) United States Patent
Mielke et al.

(10) Patent No.: US 11,143,301 B2
(45) Date of Patent: Oct. 12, 2021

(54) OIL SCRAPER RING SPRING FOR AN OIL SCRAPER RING AND OIL SCRAPER RING

(71) Applicant: SCHERDEL INNOTEC FORSCHUNGS - UND ENTWICKLUNGS-GMBH, Marktredwitz (DE)

(72) Inventors: Peter Mielke, Wunsiedel (DE); Manuel Heindl, Marktredwitz (DE); Maik Zimmermann, Tröstau (DE)

(73) Assignee: SCHERDEL INNOTEC FORSCHUNGS-UND ENTWICKLUNGS-GMBH, Marktredwitz (DE)

( * ) Notice: Subject to any disclaimer, the term of this patent is extended or adjusted under 35 U.S.C. 154(b) by 131 days.

(21) Appl. No.: 16/607,547

(22) PCT Filed: Apr. 24, 2018

(86) PCT No.: PCT/EP2018/060414
§ 371 (c)(1),
(2) Date: Oct. 23, 2019

(87) PCT Pub. No.: WO2018/197450
PCT Pub. Date: Nov. 1, 2018

(65) Prior Publication Data
US 2020/0072352 A1     Mar. 5, 2020

(30) Foreign Application Priority Data

Apr. 24, 2017 (DE) .................... 10 2017 108 683.8

(51) Int. Cl.
*F16J 9/06* (2006.01)
(52) U.S. Cl.
CPC ............... *F16J 9/068* (2013.01); *F16J 9/066* (2013.01); *F16J 9/064* (2013.01)

(58) Field of Classification Search
CPC ...... F16J 9/06; F16J 9/064; F16J 9/065; F16J 9/066; F16J 9/068; F16J 9/12
See application file for complete search history.

(56) References Cited

U.S. PATENT DOCUMENTS 2,904,377 A * 9/1959 Endres ..................... F16J 9/068
                                                    277/480
5,195,758 A * 3/1993 Erway ...................... F16J 9/066
                                                    267/1.5

(Continued)

FOREIGN PATENT DOCUMENTS

EP    2365233 A1    9/2011
EP    2703695 A1    3/2014
(Continued)

OTHER PUBLICATIONS

English language Abstract of JP2012233572A.

*Primary Examiner* — Nicholas L Foster
(74) *Attorney, Agent, or Firm* — Ware, Fressola, Maguire & Barber LLP

(57) ABSTRACT

The present invention relates to an oil scraper ring spring (1) for an oil scraper ring (3) comprising the oil scraper ring spring (1), an upper and a lower metal ring (21, 22) and provided for being mounted in an oil ring groove of a piston. The oil scraper ring spring (1) comprises a plurality of upper regions (5) and a plurality of lower regions (7) arranged in alternating manner in a circumferential direction so as to be spaced in an axial direction; connecting regions (9) each connecting the adjacent upper and lower regions (5, 7) to each other. Each of the upper and lower regions (5, 7) comprises: a nose section (13) disposed at the inner circumferential end and adapted to push the respectively abutting upper or lower metal ring (21, 22) radially outwardly, and having a through-opening (15); an abutment section (17) extending radially between the nose section (13) and the (Continued)

outer circumferential end and configured to have the respective upper metal ring (21) abutting thereon or the respective lower metal ring (22) abutting thereon; wherein the abutment section (17) has a recess (19) formed therein the depth of which, relative to the abutting area of the abutment section (17), increases in the radial direction towards the through-opening (15), and the width of which increases in the radial direction towards the through-opening (15); wherein the recess (19) in the abutment section (17) has substantially the shape of a half-funnel; wherein the half-funnel has an opening angle of 30° to 150°, in particular of 30° to 60°, or wherein the upper side edges of the recess (19) span an angular segment of 5-50°, in particular 5-15°; and wherein increasing the depth and width of the recess (19) radially inwardly together with the through-opening (15) serves to increase and accelerate the oil flow to the piston center.

20 Claims, 3 Drawing Sheets

(56) References Cited

U.S. PATENT DOCUMENTS

| 9,458,933 | B2* | 10/2016 | Ayuzawa | F16J 9/068 |
| 9,528,606 | B2* | 12/2016 | Hitosugi | F16J 9/068 |
| 9,657,838 | B2* | 5/2017 | Ooya | F16J 9/203 |
| 2011/0221141 | A1* | 9/2011 | Ayuzawa | F16J 9/068 |
| | | | | 277/434 |
| 2014/0062030 | A1* | 3/2014 | Hitosugi | F16J 9/068 |
| | | | | 277/489 |
| 2014/0246834 | A1* | 9/2014 | Ayuzawa | F16J 9/12 |
| | | | | 277/467 |
| 2015/0145218 | A1* | 5/2015 | Ooya | F16J 9/068 |
| | | | | 277/477 |

FOREIGN PATENT DOCUMENTS

| EP | 2 778 481 A1 | 9/2014 |
| JP | 2012233572 A | 11/2012 |

* cited by examiner

F ( 20 : 1 )

E ( 20 : 1 )

OIL SCRAPER RING SPRING FOR AN OIL SCRAPER RING AND OIL SCRAPER RING

The invention relates to an oil scraper ring spring for an oil scraper ring comprising the oil scraper ring spring, an upper and a lower metal ring and provided for being mounted in an oil ring groove of a piston. The invention relates furthermore to a corresponding oil scraper ring.

Oil scraper rings are used in internal combustion engines in a groove of a piston (piston groove) of the internal combustion engine and in operation have the function to strip excess oil from a cylinder inner wall or cylinder liner inner wall. It is known to form oil scraper rings in the form of a plurality of parts, for example three parts, of an upper metal ring, a lower metal ring and an oil scraper ring spring arranged therebetween.

EP 2 703 695 B1 shows an oil scraper ring spring having a plurality of upper regions and a plurality of lower regions arranged in alternating manner in a circumferential direction so as to have a spacing in an axial direction and a spacing in the circumferential direction. There are provided connecting regions which connect the respective adjacent upper and lower regions to each other. Each of the upper and lower regions has a nose section arranged at the inner circumferential end and adapted to push the respectively abutting upper or lower metal ring radially outwardly. The nose section has a through-opening. Furthermore, at each of the upper and lower regions, there is provided a supporting or abutment section which extends radially between the nose section and the outer circumferential end and is designed to have the respective upper or lower metal ring abutting or resting thereon. In the abutment section, there is formed a recess which has a constant depth in the radial direction of the oil scraper ring spring.

In the prior art, the oil flow between the oil scraper ring spring and the respective upper and lower metal ring is low during operation of the internal combustion engine, so that residues, such as combustion residues, accumulate there. Due to the relative movements between the oil scraper ring spring and the metal rings, these residues cause wear on both the metal rings and the oil scraper ring spring.

It is therefore an object of the present invention to provide an oil scraper ring spring for an oil scraper ring, which provides for improved oil transport between the oil scraper ring spring and the metal rings.

An oil scraper ring spring according to the invention for an oil scraper ring comprising the oil scraper ring spring, an upper and a lower metal ring and provided for being mounted in an oil ring groove of a piston comprises: a plurality of upper regions and a plurality of lower regions arranged in alternating manner in a circumferential direction so as to be spaced in an axial direction; connecting regions each connecting the adjacent upper and lower regions to each other; wherein each of the upper and lower regions includes: a nose section disposed at the inner circumferential end and adapted to push the respectively abutting upper or lower metal ring radially outwardly and having a through-opening; an abutment section extending radially between the nose section and the outer circumferential end and configured to have the respective upper or lower metal ring resting or abutting thereon; wherein the abutment section has a recess formed therein the depth of which, relative to the abutment area of the abutment section, increases in the radial direction towards the through-opening, and/or the width of which increases in the radial direction towards the through-opening.

During the upward and downward movement of the piston, the oil is stripped from the cylinder liner and directed inwardly to the radial inner diameter of the oil scraper ring spring where it is returned to the system via oil return bores provided on the piston. In this context, an oil pressure builds up at the radial outer diameter and at the inner diameter of the oil scraper ring spring, with part of the oil returning into the embossed recesses or depressions of the spring and the upper or lower metal ring being pushed there axially in the direction of the upper and lower piston groove sides. As a result, the respective metal ring is capable of sealing the piston groove axially against possible combustion gases in improved manner. During the next movement of the piston, the metal ring again pumps the oil out of the groove, which can flow off easily to the inner diameter of the oil scraper ring spring due the inclination of the recess.

Moreover, it is prevented by this forced backflow of the oil that the metal rings, due to the contact with the oil scraper ring spring, can alter the properties of the oil mechanically by squeezing. It is thus prevented that carbon deposits are formed in the oil under the metal ring, which can lead to clogging, jamming and ultimately breaking of the system. Larger particles due to friction are also removed in this way.

In addition, the above-described oil pressure at the outer or inner diameter of the oil scraper ring spring can be further matched or influenced by the depth or also the angle of the recess, which may be between 5° and 30°, depending on the requirements due to the engine running characteristics.

In an oil scraper ring spring according to the invention, the recess formed in the respective abutment section, in an axial movement of the oil scraper ring spring, thus acts to convey the oil in the radial direction of the oil scraper ring spring. In this case, the recesses, the depth of which relative to the abutment area of the abutment section increases in the radial direction towards the through-opening, act like half-funnels which convey the oil in the direction towards their open side. The depth or width of the recess increases towards the through-opening such that an oil flow through the through-opening results. In operation, with the respective metal rings resting or abutting on the abutment sections of the upper regions and the lower regions, a flow of oil is generated in the radial direction between the oil scraper ring spring and the abutting metal rings, along with subsequent drainage of the oil through the through-opening.

During operation of the internal combustion engine, the oil scraper ring spring according to the invention generates an increased oil flow between the oil scraper ring spring and the adjacent metal rings. As a result, combustion residues are removed from this area together with the oil. Furthermore, aging of oil due to a too long stay in this area is avoided. As a result, the friction between ring and spring and the resulting secondary wear can be reduced and thus the pollutant emissions can be improved.

The oil scraper ring spring according to the invention renders possible a reduced carbon build-up by an increased flow velocity and thus no compression of the oil and the resulting carbon build-up between the spring and the adjacent metal rings. Furthermore, there is the possibility of regulating the oil pressure on the radially outer side of the oil scraper ring spring, i.e. the side of the cylinder liner in the installed state, opposite the radially inner side, i.e. the side of the piston groove, by geometrical changes of the angle, i.e. the inclination of the embossed recess or depression. In addition, axial sealing of the piston groove is improved by hydrostatic pressing of the metal rings against the upper and lower piston groove sides.

According to an embodiment, the recess in the abutment section substantially has the shape of a half-funnel. The half-funnel-shaped design of the recess in the abutment section allows a uniform course of the increase in depth in the direction towards the through-opening. The half-funnel preferably has an opening angle of 30° to 150°, in particularly preferred manner of 30° to 60°. In the narrower angle portion, there is created a particularly good conveying effect with respect to the oil in the radial direction. At the same time, the opening angle of the half-funnel-shaped recess is so great that there is a sufficient conveying volume created in the recess for the oil.

According to an embodiment, the recess, together with the through-opening, serves to enlarge and accelerate the flow of oil towards the piston center. Due to the fact that the recess increases in depth or width radially inwardly, i.e. in the direction towards a piston enclosed by the oil scraper ring spring, there is achieved an accelerated oil flow of the oil conveyed from the oil scraper ring spring and the associated metal rings in the radial direction, i.e. towards the center of the piston. The recess cooperates with the adjacent through-opening and provides for good drainage of the oil together with the combustion residues.

According to an embodiment, the radially outer end of the recess in the abutment section is arranged at a recess start position spaced from the outer circumferential end, in particular spaced from the outer circumferential end by 20 to 30% of the width of the oil scraper ring spring, as viewed in the radial direction. As a result, a region of the abutment section remains free from the recess, which leads to a larger contact area for the metal ring on the abutment section of the oil scraper ring spring. As a result, the load of the oil scraper ring spring due to the metal ring in the region of the abutment section can be reduced. In particular, the abrasion of the oil scraper ring spring due to the metal ring abutting on the oil scraper ring spring is reduced.

According to an embodiment, the part of the abutment section between the recess start position and the outer circumferential end is located in the radial plane of the abutment section. Here, radial plane is understood to mean a plane which is in contact with the abutment section and in particular intersects the axis of symmetry of the oil scraper ring spring at right angles. This results in a partially sheet-like support of the metal ring on the oil scraper ring spring, whereby the surface load in the contact area between the oil scraper ring spring and the metal ring is kept low and wear is minimized. This is particularly advantageous for small relative movements between the oil scraper ring spring and the metal ring abutting thereon.

According to an embodiment, the radially inner end of the recess has a maximum depth of 0.05 mm with respect to the plane of the abutment section. Test series have revealed that even with this small depth of the recess, the oil conveying effect in the direction towards the through-opening is sufficiently provided. A small depth of the recess formed offers the advantage of large possible curvature radii of the oil scraper ring spring in the region of the abutment section and thus low point or line loads in the contact area with the metal ring.

According to an embodiment, the radially outer end of the recess in the abutment section is arranged at a recess start position whose width corresponds in particular to the width of 10 to 20% of the width of the through-opening. The width of the through-opening is understood here as the maximum extension in the circumferential direction of the oil scraper ring spring.

According to an embodiment, the width of the recess in the abutment section increases in the radial direction from the recess start position to the radial position of the through-opening, in particular such that the width of the recess at the radial position of the through-opening corresponds to the width of the through-opening. At the location where the recess opens into the through-opening, as seen in the circumferential direction of the oil scraper ring spring, the recess thus has the same width as the through-opening.

This results in particularly undisturbed drainage of the oil accumulating in the recess during operation into the through-opening. Holding back of the oil at the nose section is thus largely avoided.

According to an embodiment, the width of the through-opening is at least 0.1 to 0.7 mm. With this width, a good flow through the through-opening is already achieved even in case of high viscosity of the oil of, for example, 21.9 $mm^2/s$.

According to an embodiment, the sectional area of the through-opening is arranged substantially in the axial direction and/or has an area of 0.1 to 0.5 square millimeters.

According to an embodiment, the height of the through-opening, as measured substantially in the axial direction from the bottom side of the highest part of the nose section to the upper side of the deepest part of the recess, is 0.1 to 0.9 mm.

According to an embodiment, the extension direction of the recess is in the radial direction; and/or the recess is aligned with the respective through-opening. The radial extension direction of the recess provides a particularly short transport distance for the oil in the radial direction across the oil scraper ring spring. Preferably, the recess is symmetrical in the radial direction, i.e. perpendicular to the circumferential direction of the oil scraper ring spring. Due to the fact that the recess is aligned with the respective through-opening, optimum transport of the oil accumulated in the recess through the through-opening is achieved. Holding back or stagnating of oil at the through-opening is avoided.

According to an embodiment, the upper side of the bottom of the recess encloses an angle of 3-30° with the radial plane; and/or the upper side edges or sides of the recess span an angular segment of 5-50°, preferably of 5-15°. The upper side of the bottom preferably includes an angle of 3-30° with the radial plane when viewed in the radial direction. The upper side of the bottom of the recess is understood here as the region in which the oil accumulates, which thus has a trough-shaped configuration. The angle of 3-30° leads to good drainage behavior of the oil in the direction towards the through-opening. The oil is thereby pressed, due its inertia and viscosity, into the recess during operation by the oscillating movement of the oil scraper ring spring together with the piston. The resulting pressure along with the angle of 3-30° leads to drainage of the oil on the upper side of the bottom towards the through-opening. The angular range of 5-50°, preferably from 5-15°, for the angular segment of the side edges of the recess is measured in a plane that is parallel to the extension axis of the oil scraper ring spring and in particular orthogonal to the extension direction of the recess. In the angular range mentioned, very good channel-like accumulation of the oil in the recess is achieved.

According to an embodiment, the radial width of the nose section is 0.2 to 1.2 mm; and/or the radial width of the abutment section is 0.1 to 1.1 mm. The radial width of the nose section is understood to be the maximum extension thereof in the circumferential direction of the oil scraper ring spring. The radial width of the abutment section is understood to be the maximum extension thereof in the circumferential direction of the oil scraper ring spring.

According to one aspect, the invention relates to an oil scraper ring for being mounted in an oil ring groove of a piston, comprising an oil scraper ring spring, an upper metal ring resting or abutting on the abutment sections of the upper regions of the oil scraper ring spring, and the radially inner surface thereof abutting the radially outer surfaces of the nose sections of the upper regions of the oil scraper ring spring; and a lower metal ring abutting on the abutment sections of the lower regions of the oil scraper ring spring and the radially inner surface thereof abutting the radially outer surfaces of the nose sections of the lower regions of the oil scraper ring spring.

The invention will be explained in more detail in the following on the basis of exemplary embodiments with reference to the attached figures, wherein.

In the figures, the same reference numerals designate the same or functionally identical components, unless indicated otherwise.

Figure 1:
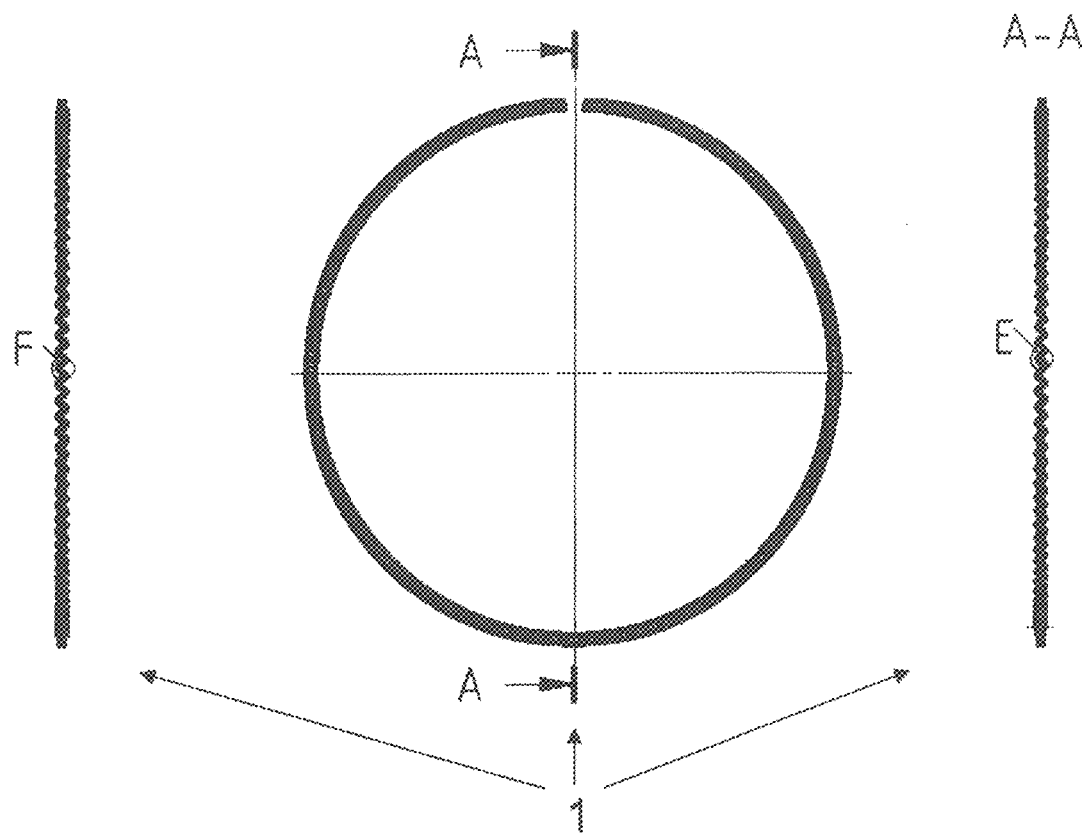
FIG. 1 shows an oil scraper ring spring for an oil scraper ring according to an embodiment in a plan view and two side views.

FIG. 1 shows an oil scraper ring spring 1 for an oil scraper ring 3 (not shown in FIG. 1) according to an embodiment in a plan view and two side views. In the middle of the image, the oil scraper ring spring 1 is shown in a plan view. The oil scraper ring spring 1 is arranged in the image plane of FIG. 1 while extending substantially circularly. Two arrows arranged one above the other in the image and pointing to the right and identified by the capital letter A indicate a sectional plane A-A. The sectional plane A-A extends through the vertical axis of symmetry of the oil scraper ring spring 1 orthogonally into the image plane. On the right side in the image, there is shown a sectional view of the oil scraper ring spring 1 as seen in the sectional plane A-A. On the left side in the image, there is shown a side view of the oil scraper ring spring 1. The letter E marks a detail in the sectional view, which will be described with reference to FIG. 4. The letter F indicates a detail in the left side view, which will be described with reference to FIG. 3.

Figure 2:
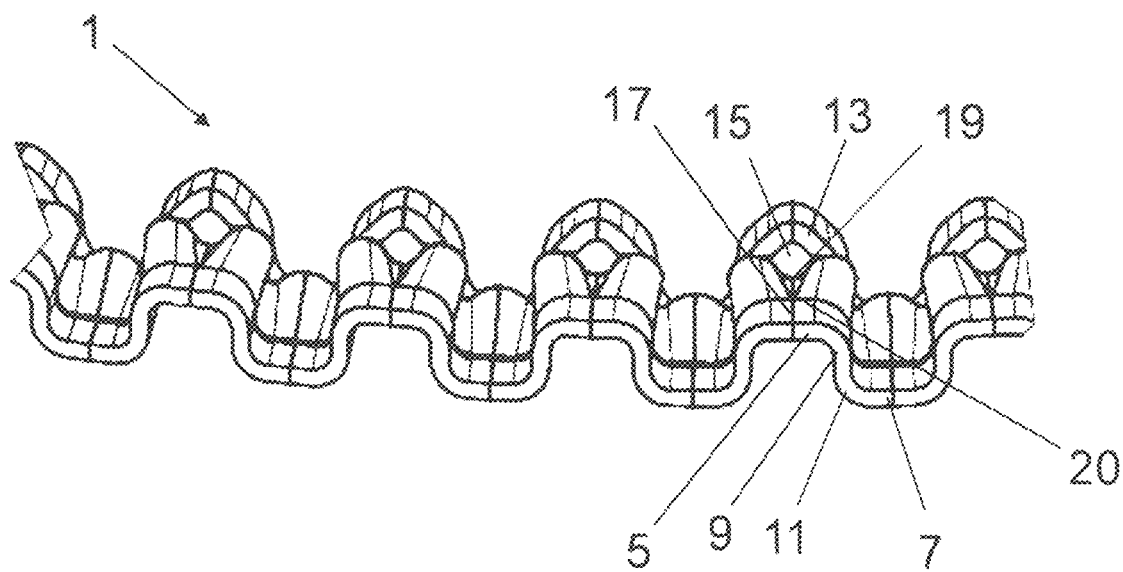
FIG. 2 shows a partial region of the oil scraper ring spring according to the embodiment of FIG. 1 in a perspective view.

FIG. 2 shows a partial region of the oil scraper ring spring 1 according to the embodiment of FIG. 1 in a perspective view. The region shown illustrates a ring segment of the oil scraper ring spring 1. The representation shown in FIG. 2 results, for example, from the central illustration of FIG. 1, by cutting out a lower part of the oil scraper ring spring 1 in the image and pivoting the same upwardly into the image plane. The oil scraper ring spring 1 according to this embodiment is designed substantially symmetrically with respect to a radial plane oriented perpendicularly to the axis of symmetry of the oil scraper ring spring.

A plurality of upper regions 5 and a plurality of lower regions 7 are alternately arranged in a circumferential direction of the oil scraper ring spring 1 so as to be spaced in the axial direction and circumferentially directly adjacent upper regions 5 and directly adjacent lower regions 7 are spaced from each other in the circumferential direction. Connecting regions 9 connect the respectively adjacent upper regions 5 and lower regions 7. In the present embodiment, the connecting regions have rounded portions 11, so that the upper regions 5 and the lower regions 7 merge with each other in rounded manner via the connecting regions 9. This shape is readily visible in FIG. 2 as an approximated wavy line on the side facing the viewer, which at the same time constitutes the outer periphery of the oil scraper ring spring 1.

The upper regions 5 and the lower regions 7 each have a nose section 13 arranged at the inner circumferential end. The nose sections 13 each have a through-opening 15 in the present embodiment. In FIG. 2, the nose sections 13 are visible at the rear edge of the image in the form of an inverted rounded V. In this illustration, only the nose sections 13 of the upper regions 5 projecting upwards in the image can be seen, while the downwardly projecting nose sections 13 of the lower regions 7 are hidden in the illustration. However, the lower nose sections 13 are clearly visible in FIGS. 3 and 4.

Each of the upper regions 5 and the lower regions 7 further includes an abutment section 17 extending radially between the nose section 13 and the outer circumferential end and configured to have an upper metal ring 21 (not shown in FIG. 2) or a lower metal ring 23 (not shown in FIG. 2) of the oil scraper ring 3 resting or abutting thereon. An oil scraper ring 3 then comprises the oil scraper ring spring 1, an upper metal ring 21 abutting on the abutment section 17 of the upper region 5, and a lower metal ring 23 abutting on the abutment section of the lower region 7.

The nose sections 13 are configured to confine the metal rings 21, 23 in their freedom of movement radially inwardly. The respective metal ring 21, 23 then extends radially outwardly past the nose sections 13 and, for example, directly abuts the nose sections 13. In this manner, centering of the upper and lower metal ring 21, 23 coaxially with respect to the oil scraper ring spring 1 is achieved.

In each abutment section 17, a recess 19 is formed in the present embodiment, the depth of which, in relation to the abutment area of the abutment section 17, increases in the radial direction towards the through-opening 15 and the width of which increases in the radial direction towards the through-opening 15. The recesses 19 can be seen in the image as V-shaped portions at the abutment sections of the upper regions. In this embodiment, the recesses 19 start at about two-thirds of the radial extension of the abutment section 17 from the outer periphery of the oil scraper ring spring 1. In the direction towards the through-opening 15, the depth and width of the recess 19 then increase. In the image, the recesses at the abutment sections 17 of the lower regions 5 can be seen as upwardly directed bulges or projections in the image. In this embodiment, the radially outer end of the recess 19 is disposed in the abutment section 17 at a recess start position 20 which is spaced from the outer circumferential end. This results in an enlarged recess-free abutment surface for the respective metal ring 21, 23. In the present embodiment, the connecting regions 9 have a width which increases in the circumferential direction of the oil scraper ring spring 1 towards the nose sections 13.

In operation, the oil scraper ring spring 1 is arranged in a groove of a piston of an internal combustion engine along with the upper metal ring 21 and the lower metal ring 23 placed on both sides thereof so as to form an oil scraper ring 3. The oil scraper ring spring 1 is then reciprocated in operation in its axial direction in relation to a cylinder in which the piston operates. Excess oil that accumulates between the upper metal ring 21 and the lower metal ring 23 in the region of the oil scraper ring spring 1 can be dissipated radially via the recesses 19 in the abutment sections 17 and the through-openings 15 in the nose sections 13. The recesses 19 and the through-openings 15 aligned with the recesses 19 in this embodiment cooperate for good oil transport. Combustion and oil residues thus can be effectively discharged from the region of the oil scraper ring spring 1, i.e. the region between the upper metal ring 21 and the lower metal ring 23. It is thus possible to reduce friction in the engine, increase engine efficiency, extend engine life, and improve harmful emissions.

Figure 3:
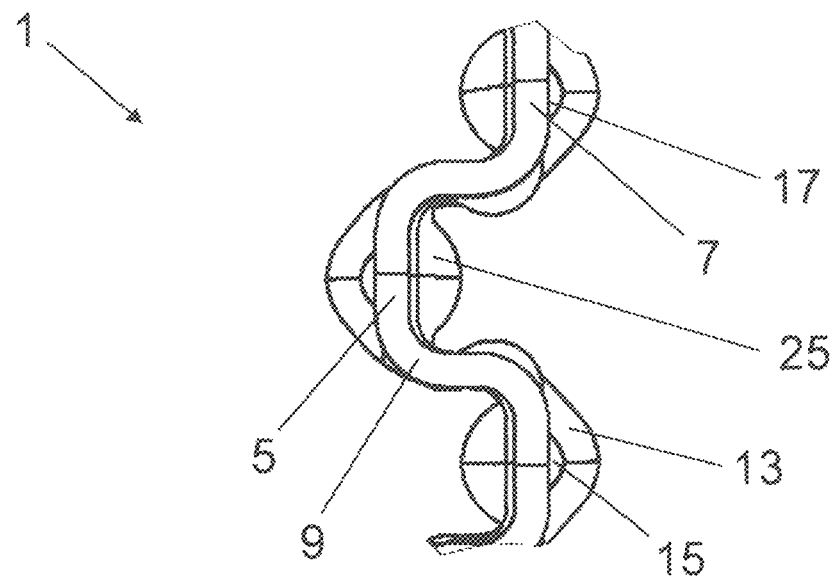
FIG. 3 shows the oil scraper ring spring according to the embodiment of FIG. 1 as an enlarged view F, at the location marked with the letter F in the left side view in FIG. 1.

FIG. 3 shows the oil scraper ring spring 1 according to the embodiment of FIG. 1 as an enlarged illustration at the location marked with the letter F in the left side view in FIG. 1. In this illustration, the outer circumference of the oil scraper ring spring 1 is directed towards the viewer, while the inner circumferential end with the nose sections 13 is located at the bottom in the image plane. The nose sections 13 protrude to the left and to the right from the substantially vertical extension of the portion of the oil scraper ring spring 1. In this side view, the lower regions 7 with the nose sections provided there are recognizable as well. The lower regions 7 protrude to the right in the image, while the upper regions 5 extend to the left. The recesses 19 are not directly visible in this view, however, there are projections 25 recognizable, which form the bottom of the recesses 19 and which are due to the shape of the recesses 19 and the realization in the form of a sheet metal molding.

Figure 4:
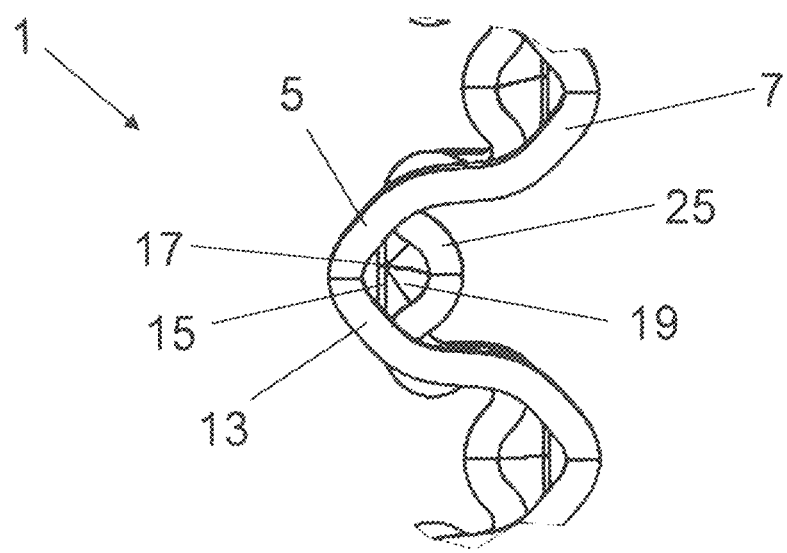
FIG. 4 shows the oil scraper ring spring according to the embodiment of FIG. 1 as an enlarged detail E of the section A-A, as marked on the right side in FIG. 1.

FIG. 4 shows the oil scraper ring spring 1 according to the embodiment of FIG. 1 as an enlarged detail E of the section A-A, as marked on the right in FIG. 1. In this view, the nose sections 13 are in front in the image. The observer's gaze is directed through the respective through-opening 15 in radially outward direction into the recess 19. In this view, it is readily visible how the recess 19 in the upper region 5, as seen radially in the direction of the lower regions 7 presents itself as projection in the material of the oil scraper ring spring 1. The abutment sections 17 can be seen in this illustration through the through-openings 15 as substantially vertically extending lines.

Figure 5:
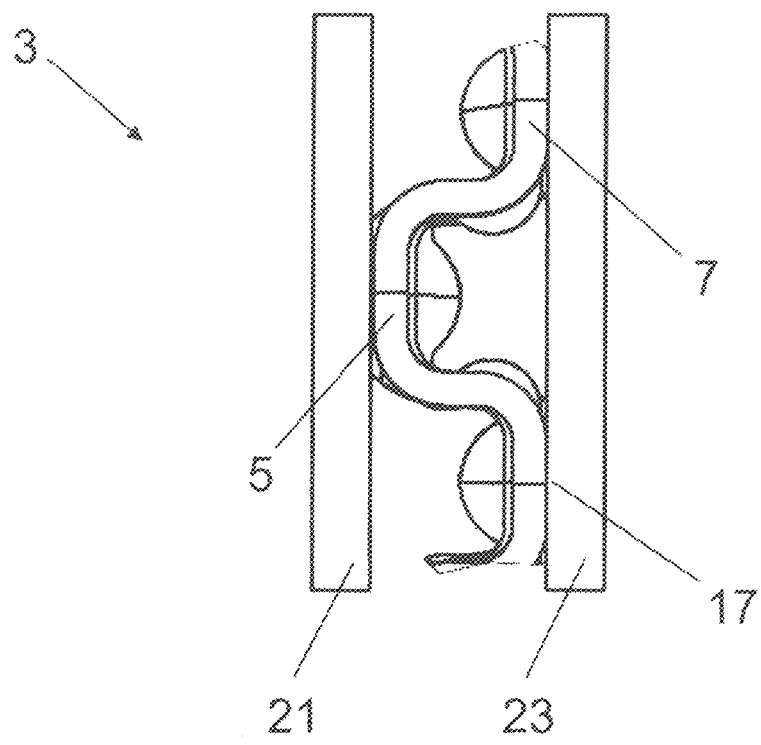
FIG. 5 shows an oil scraper ring according to a first embodiment as a detail as in the lateral sectional view in FIG. 4.

FIG. 5 shows an oil scraper ring 3 according to a first embodiment as a section as in the lateral sectional view in FIG. 4. The oil scraper ring 3 comprises an oil scraper ring spring 1 extending between an upper metal ring 21 and a lower metal ring 23. The metal rings 21, 23 are pushed apart or held spaced apart by the oil scraper ring spring 1.

The oil scraper ring spring 1 is designed as described in FIGS. 1 to 4. In the direction to the rear in the image plane, the nose sections 13 are arranged such that they engage behind the metal rings 21, 23 arranged in the image plane in front of the same and confine or push the same in radially outward direction.

Figure 6:
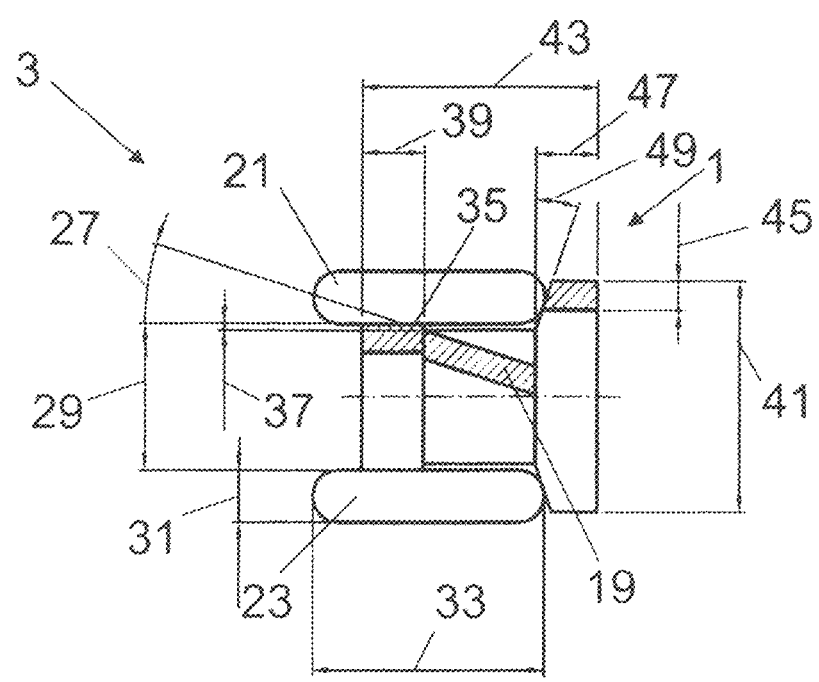
FIG. 6 shows the oil scraper ring according to the first embodiment as a sectional view.

FIG. 6 illustrates the oil scraper ring 3 according to the first embodiment in a sectional view.

The upper metal ring 21 is shown in this illustration above the lower metal ring 23 as a rounded rectangle. The oil scraper ring spring 1 is arranged between the two metal rings 21, 23 and shown partially hatched. By way of this illustration, the geometry of the oil scraper ring 3, in particular the oil scraper ring spring 1, is to be further clarified. A recess angle 27 illustrates the angle included between the upper side of the bottom of the recess 19 and the radial plane of the oil scraper ring spring 1. In the image, the depth of the recess 19 increases from left to right to its maximum depth, i.e. its maximum spacing to the upper metal ring 21 abutting on the oil scraper ring spring 1.

A supporting height 29 indicates the spacing dimension of the lower metal ring 23 and upper metal ring 21 by the oil scraper ring spring 1. An axial metal ring thickness 31 as the extension thereof in the axial direction and a radial metal ring width 33 as the extension thereof in the radial direction are shown as dimensions at the lower metal ring 23.

Furthermore, this illustration of the oil scraper ring spring 1 according to the present embodiment reveals a shoulder 35 which extends in the direction towards the upper metal ring 21 and serves for abutment of the upper metal ring 21 thereon. A corresponding shoulder 35 is provided on the oil scraper ring spring 1 for abutment of the lower metal ring 23 thereon, but is not visible in this illustration. The shoulder has a shoulder height 37 with which it projects radially beyond the level of the beginning of the recess 19 in the direction towards the upper metal ring 21. A shoulder length 39 of the shoulder 35 indicates the extension thereof radially along the oil scraper ring spring 1. An enlargement of the shoulder length 39 accordingly entails an enlargement of the contact area between the respective metal ring 21, 23 and the associated shoulder 35.

An axial spring height 41 of the oil scraper ring spring 1 indicates the extension thereof, i.e. the dimension thereof, in the axial direction. A radial spring width 43 of the oil scraper ring spring 1 designates the extension thereof in the radial direction of the oil scraper ring spring 1. A material thickness 45 is shown in the hatched area of the oil scraper ring spring 1 extending here perpendicularly into the plane of the paper. For example, the oil scraper ring spring 1 is produced as a sheet metal bent part from a metal sheet in accordance with the material thickness 45.

Furthermore, this figure indicates a thickness 47 of the nose section 13. The thickness 47 corresponds to a radial extension of the nose section 13, beginning at the end of the recess 19 to the radial end of the nose section 13. An angle 49 of the nose section 13 corresponds to the inclination thereof relative to the axial direction of the oil scraper ring spring 1. The angle 49 causes axial pushing apart of the metal rings 21, 23 as a result of a radial pressing force between the nose section 13 arranged at the angle 49 and the metal rings 21, 23.

LIST OF REFERENCE NUMERALS 1 oil scraper ring spring
3 oil scraper ring
5 upper regions
7 lower regions
9 connecting regions
11 rounded portion
13 nose section
15 through-opening
17 abutment section
19 recess
20 recess start position
21 upper metal ring
23 lower metal ring
25 projection
27 recess angle
29 supporting height
31 axial metal ring thickness
33 radial metal ring thickness
35 shoulder 37 shoulder height
39 shoulder length
41 axial spring height
43 axial spring width
45 material thickness
47 thickness of nose section
49 angle of nose section
A arrow of sectional plane
E detail in sectional view
F detail in side view

We claim:

1. An oil scraper ring spring (1) for an oil scraper ring (3) having an upper metal ring (21) and a lower metal ring (23), the oil scraper ring (3) for being mounted in an oil ring groove of a piston having a center, comprising:
    a plurality of upper regions (5) and a plurality of lower regions (7) arranged in alternating manner in a circumferential direction so as to be spaced in an axial direction;
    connecting regions (9), each connecting adjacent upper and lower regions (5, 7) to each other;
    wherein each of the plurality of upper regions (5) and the plurality of lower regions (7) includes:
    a nose section (13) disposed at an inner circumferential end and adapted to push respectively abutting upper or lower metal ring (21, 23) radially outwardly, and having a through-opening (15);
    an abutment section (17) extending radially between the nose section (13) and an outer circumferential end and configured to have either the upper metal ring (21) abutting thereon or the lower metal ring (23) abutting thereon;
    wherein the abutment section (17) has a recess (19) formed therein having a depth relative to an abutment area of the abutment section (17) that increases in a radial direction towards the through-opening (15), and having a width that increases in the radial direction towards the through-opening (15);
    wherein the recess (19) in the abutment section (17) has a shape substantially of a half-funnel;
    wherein the half-funnel of the recess (19) has an opening angle in a range of 30° to 150°, or wherein upper side edges of the recess (19) span an angular segment in a corresponding range of 5-50°; and
    wherein the depth and width of the recess (19) together with the through-opening (15) allow for an increase and accelerate of oil flow to the center of the piston.

2. The oil scraper ring spring (1) according to claim 1, wherein a radially outer end of the recess (19) in the abutment section (17) is arranged at a recess start position (20) spaced from the outer circumferential end, including being spaced from the outer circumferential end by about 20 to 30% of a width of the oil scraper ring spring (1), as viewed in the radial direction.

3. The oil scraper ring spring (1) according to claim 2, wherein a part of the abutment section (17) between a start position of the recess (19) and the outer circumferential end is located in a radial plane of the abutment section (17).

4. The oil scraper ring spring (1) according to claim 1, wherein a radially inner end of the recess (19) has a maximum depth of 0.05 mm with respect to a plane of the abutment section (17).

5. The oil scraper ring spring (1) according to claim 1, wherein a radially outer end of the recess (19) in the abutment section (17) is arranged at a recess start position (20), the width of the recess (19) corresponds to about 10 to 20% of a corresponding width of the through-opening (15).

6. The oil scraper ring spring (1) according to claim 5, wherein the width of the recess (19) in the abutment section (17) increases in the radial direction from the recess start position (20) to a radial position of the through-opening (15), including increasing such that the width of the recess (19) at the radial position of the through-opening (15) corresponds to the corresponding width of the through-opening (15).

7. The oil scraper ring spring (1) according to claim 1, wherein a corresponding width of the through-opening (15) is in a range of 0.1 to 0.7 mm.

8. The oil scraper ring spring (1) according to claim 1, wherein a sectional area of the through-opening (15) is arranged substantially in the axial direction and/or has an area in a range of 0.1 to 0.5 square millimeters.

9. The oil scraper ring spring (1) according to claim 1, wherein a height of the through-opening (15), as measured substantially in the axial direction from a bottom side of a highest part of the nose section (13) to an upper side of a deepest part of the recess (19), is in a range of 0.1 to 0.9 mm.

10. The oil scraper ring spring (1) according to claim 1, wherein an extension direction of the recess (19) is in the radial direction; and/or
wherein the recess (19) is aligned with the respective through-opening (15).

11. The oil scraper ring spring (1) according to claim 1, wherein an upper side of a bottom of the recess (19) forms an angle in a range of 3-30° with a radial plane.

12. The oil scraper ring spring according to claim 1, wherein a radial width of a nose section (13) is in a range of 0.2 to 1.2 mm; and/or
wherein a corresponding radial width of an abutment section (17) is in a range of 0.1 to 1.1 mm.

13. An oil scraper ring (3) for being mounted in an oil ring groove of a piston, comprising:
    the oil scraper ring spring (1) according to claim 1,
    the upper metal ring (21) abutting on the abutment sections (17) of the plurality of upper regions (5) of the oil scraper ring spring (1) and a radially inner surface thereof abutting radially outer surfaces of nose sections (13) of the plurality of upper regions (5) of the oil scraper ring spring (1); and
    a lower metal ring (23) abutting on the abutment sections (17) of the plurality of lower regions (7) of the oil scraper ring spring (1) and a radially inner surface thereof abutting radially outer surfaces of the nose sections (13) of the plurality of lower regions (7) of the oil scraper ring spring (1).

14. The oil scraper ring spring (1) according to claim 2, wherein a radially inner end of the recess (19) has a maximum depth of 0.05 mm with respect to a plane of the abutment section (17).

15. The oil scraper ring spring (1) according to claim 2, wherein the radially outer end of the recess (19) in the abutment section (17) is arranged at a recess start position (20), the width of the recess (19) corresponds to about 10 to 20% of a corresponding width of the through-opening (15).

16. The oil scraper ring spring (1) according to claim 2, wherein a corresponding width of the through-opening (15) is in a range of 0.1 to 0.7 mm.

17. The oil scraper ring spring (1) according to claim 2, wherein a sectional area of the through-opening (15) is arranged substantially in the axial direction and/or has an area in a range of 0.1 to 0.5 square millimeters.

18. The oil scraper ring spring (1) according to claim 2, wherein a height of the through-opening (15), as measured substantially in the axial direction from a bottom side of a highest part of the nose section (13) to an upper side of a deepest part of the recess (19), is in a range of 0.1 to 0.9 mm.

19. The oil scraper ring spring (1) according to claim 2,
    wherein an extension direction of the recess (19) is in the radial direction; and/or
    wherein the recess (19) is aligned with the through-opening (15).

20. The oil scraper ring spring (1) according to claim 2, wherein an upper side of a bottom of the recess (19) forms an angle in a range of 3-30° with a radial plane.

\* \* \* \* \*